(12) United States Patent
Bell et al.

(10) Patent No.: US 9,694,374 B2
(45) Date of Patent: Jul. 4, 2017

(54) SUCK-BACK LIQUID DISPENSING VALVE AND VALVE ASSEMBLY

(71) Applicant: Dab-O-Matic Holdings Company, Mount Vernon, NY (US)

(72) Inventors: James Bell, Eastchester, NY (US); Scott Bell, Stamford, CT (US)

(73) Assignee: Dab-O-Matic Holdings Company, Mount Vernon, NY (US)

( * ) Notice: Subject to any disclaimer, the term of this patent is extended or adjusted under 35 U.S.C. 154(b) by 0 days.

(21) Appl. No.: 14/858,928

(22) Filed: Sep. 18, 2015

(65) Prior Publication Data

US 2017/0080441 A1    Mar. 23, 2017

Related U.S. Application Data

(60) Provisional application No. 62/052,791, filed on Sep. 19, 2014.

(51) Int. Cl.
*B65D 37/00* (2006.01)
*B65D 35/50* (2006.01)
(Continued)

(52) U.S. Cl.
CPC ...... *B05B 11/0064* (2013.01); *B05B 11/0072* (2013.01); *B05B 11/047* (2013.01);
(Continued)

(58) Field of Classification Search
CPC ............. B05B 11/0064; B05B 11/0072; B05B 11/047; B05B 1/3097; B05B 11/3097;
(Continued)

(56) References Cited

U.S. PATENT DOCUMENTS

| 3,438,554 A | 4/1969 | Schwartzman |
| 3,506,162 A | 4/1970 | Schwartzman |

(Continued)

FOREIGN PATENT DOCUMENTS

WO    WO 95/22504    8/1995

OTHER PUBLICATIONS

Search Report and Written Opinion dated Dec. 22, 2015 which issued in the corresponding International Patent Application No. PCT/US15/51014.

*Primary Examiner* — Frederick C Nicolas
(74) *Attorney, Agent, or Firm* — Cozen O'Connor

(57) ABSTRACT

A suck-back valve selectively actuatable for dispensing liquid in its open condition from an associated liquid storage container, and for avoiding continued presence of excess dispensed liquid about the exit orifice in the closed condition of the valve, is formed at least in part of a spring member and a pin. The spring member includes a distal web that defines a valve seat and a dispensed liquid exit orifice, a proximal web, and a plurality of flexibly elastic bands helically connecting the distal and proximal webs. The pin includes an elongated shaft having a proximal end secured to the proximal web and carrying a substantially hollow frusto-conical cone at its distal end. The cone has an outer valving surface for releasable abutment with the valve seat and the shaft has a bore of predetermined cross-sectional extent defined longitudinally along and within the shaft to create a continuous fluid passageway through and along the pin. Dispensed liquid remaining proximate the exit orifice is sucked back into the liquid container through the shaft bore as the valve returns from its open to its closed condition under the return urgency of the elastic bands.

29 Claims, 2 Drawing Sheets

(51) Int. Cl.
  *B65D 35/00* (2006.01)
  *B05B 11/04* (2006.01)
  *B05B 11/00* (2006.01)
  *F16K 15/02* (2006.01)
  *B65D 47/20* (2006.01)

(52) U.S. Cl.
  CPC ......... *F16K 15/026* (2013.01); *B05B 11/3097* (2013.01); *B65D 47/2031* (2013.01); *B65D 47/2075* (2013.01)

(58) Field of Classification Search
  CPC .............. F16K 15/026; B65D 47/2075; B65D 47/2031
  See application file for complete search history.

(56) References Cited

U.S. PATENT DOCUMENTS

| | | | | |
|---|---|---|---|---|
| 3,705,668 | A | * 12/1972 | Schwartzman | .... B65D 47/2075 222/207 |
| 4,394,945 | A | 7/1983 | Taylor, Jr. | |
| 4,747,522 | A | 5/1988 | McIntyre | |
| 5,074,440 | A | * 12/1991 | Clements | ............ B05B 11/0021 222/189.09 |
| 5,605,257 | A | * 2/1997 | Beard | ................. B05B 11/0016 222/189.09 |
| 2002/0189679 | A1 | 12/2002 | Avis et al. | |
| 2005/0006609 | A1 | 1/2005 | Fukano | |

\* cited by examiner

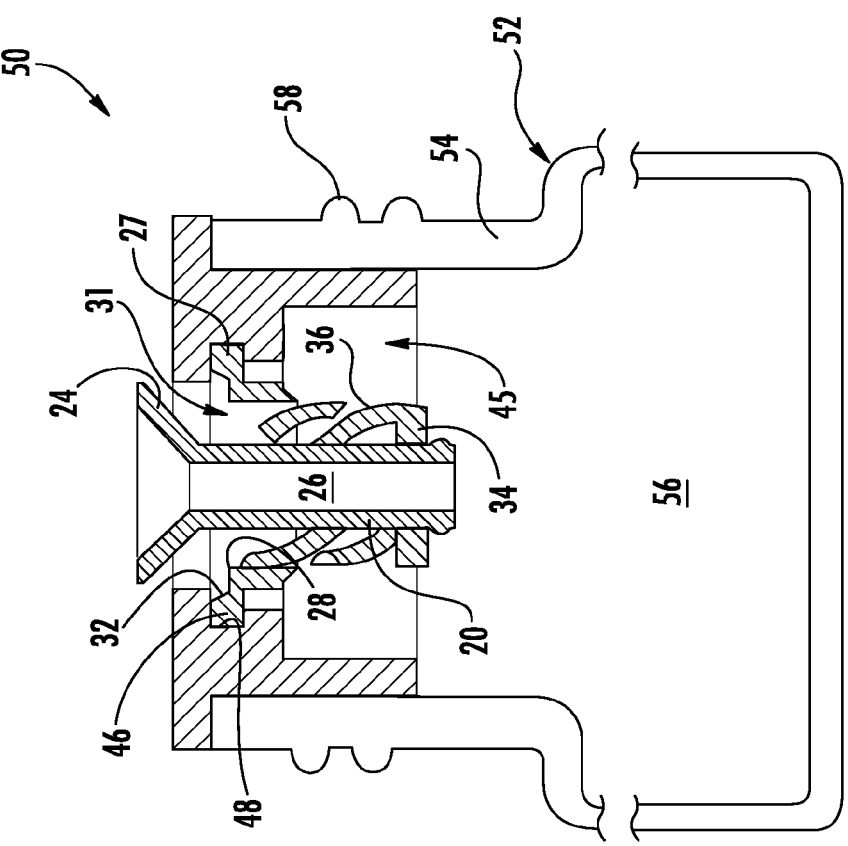
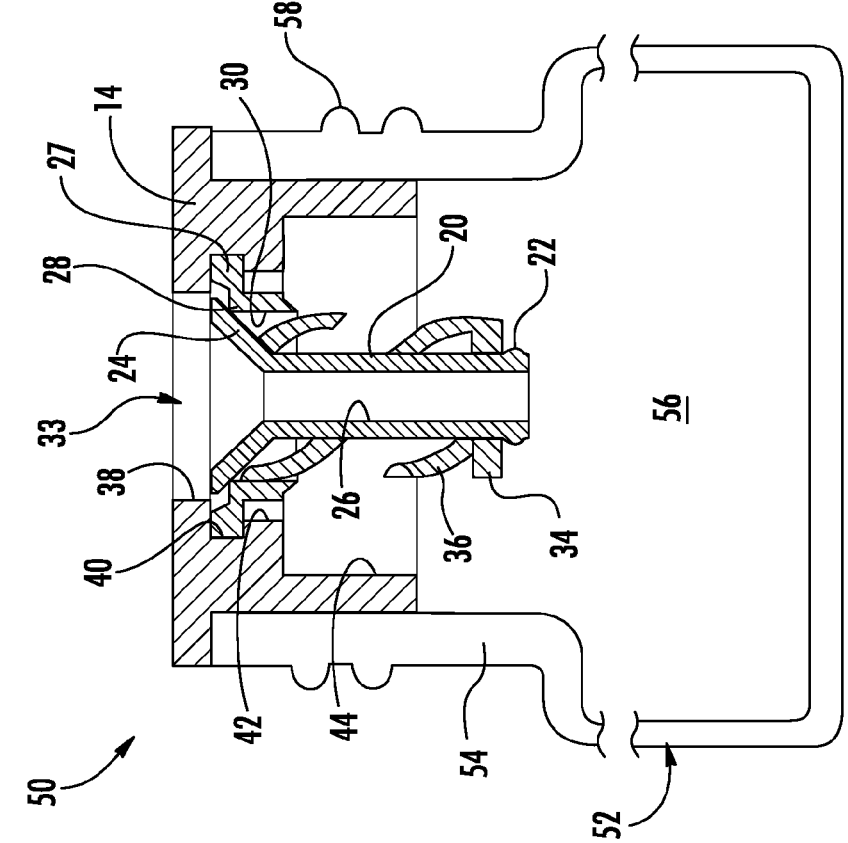

SUCK-BACK LIQUID DISPENSING VALVE AND VALVE ASSEMBLY

PRIOR APPLICATION

This application claims priority from U.S. Provisional Patent Application Ser. No. 62/052,791 which was filed on Sep. 19, 2014.

FIELD OF THE INVENTION

The present invention is directed to liquid dispensing valves, and most particular to such valves that advantageously function to draw back through the valve, into an associated liquid storage source from which liquid is operably dispensed by selective activation of the valve, liquid that remains on or about or proximate the dispensing opening of the valve when the valve is deactivated to seal closed the dispensing opening.

BACKGROUND OF THE INVENTION

The dispensing of stored liquids from, for example, small hand-held dispensers commonly activated by selective manual pressing or squeezing or manipulation of a flexible wall portion or feature or the like of the dispenser has become a ubiquitous way of making selective use of a wide variety of liquids of all viscosities, from extremely "thin" or water-like liquids such as scented toilet water to highly viscous liquids such as toothpaste. A common problem that arises in the use of such dispensers is that, as the dispenser is manipulated to open the valve—which is normally closed to prevent leakage when not in use—so as to release a desired amount of the stored liquid and to then cause or allow the valve to close, some amount of the released or dispensed liquid often remains on the surface areas of and about the dispensing opening of the valve. It is not uncommon, particularly with increasing viscosity of the liquid, for increasing amounts of the dispensed liquid to collect and remain on and about the outlet of the dispenser. The presence of this excess liquid is unsightly, unhealthy and can interfere with the ability of the valve to fully close and/or the functioning of the valve insofar as allowing selective user control of the dispensing operation. Previous efforts to avoid this problem, as by attempting to cause such excess liquid to be "sucked back" into the dispenser as the valve closes, for example by increasing the force by which the valve closes (and correspondingly, that required to open the valve), have merely made such dispensers more difficult to operate without significantly alleviating this issue.

OBJECTS AND SUMMARY OF THE INVENTION

It is accordingly the desideratum of the invention to provide an improved suck-back valve for selectively dispensing a stored or other source of liquid and for advantageously and effectively drawing back through the valve dispensed liquid that remains on or about or proximate the dispensing opening of the valve when selectively activation of the valve is discontinued to return the valve to its closed or deactivated or sealing condition.

It is a further object of the invention to provide such suck-back functionality in a liquid dispensing valve that is highly effective using liquids of a wide range of viscosities and like characteristics.

The present invention provides an improved liquid dispensing valve and valve assembly for use with an associated liquid storage container or housing to form a liquid dispensing device or apparatus, and that is especially adept at operatively avoiding the continued presence of excess dispensed liquid at and about the exit orifice after the cessation of user-applied liquid dispensing-effecting force or other user-supplied mechanical effort or motion to the typically-flexible or resiliently flexible container.

A suck-back valve selectively actuatable for dispensing liquid through a dispensing opening in an open condition of the valve, and constructed in accordance with a preferred embodiment of the invention, is formed at least in part of a spring member and a pin. The spring member includes a distal web that defines an exit orifice bounded by a shoulder wall, a proximal web, and a plurality of flexibly elastic bands helically connecting the distal web and the proximal web for resiliently urging the distal web and the proximal web toward a predetermined spacing. The pin includes an elongated shaft having a proximal end and carrying a substantially hollow frustoconical cone at a distal end of the shaft. The cone has an outer valving surface and the shaft has a bore of predetermined cross-sectional extent defined longitudinally along and within the shaft to create a continuous fluid passageway through and along the pin. The pin is coupled at its proximal end to the proximal web of the spring member and the cone valving surface abuts, in a closed condition of the valve, the distal web shoulder wall to capture the pin within the spring member for relative longitudinal displacement of the pin between a first position in which the valve is closed and a second position in which the valve is open for dispensing of liquid, so that a distally-directed actuating force selectively applied to the pin distally displaces the pin and the coupled proximal end of the proximal web against a compressive return urgency of the elastic bands to reduce the spacing between the distal web and the proximal web and to displace the valving surface distally from its abutment with the distal web shoulder to open the valve and enable a dispensing release of liquid through the discharge opening of the open valve. The distal web shoulder includes a valve seat against which the valving surface abuts in the closed position of the valve, and with the distal displacement of the pin the valving surface moves from its abutment with the valve seat to define, between the valving surface and the valve seat, the dispensing opening as a spacing between the valving surface and the valve seat. In accordance with the invention, pin bore is predeterminately sized so that, when the distally-directed actuating force on the pin is at least reduced, the return urgency of the compressed bands proximally displaces the pin to close the dispensing opening between the valving surface and the valve seat and enable at least some dispensed liquid that remains proximate the dispensing opening to be sucked back through the pin bore as the valve is deactivated from its open to its closed condition. A preferred diameter of the pin bore is in the range of approximately 0.002 to 0.050 inches, a further preferred diameter of the pin bore is in the range of approximately 0.002 to 0.010 inches, and a most preferred diameter of the pin bore—at least for liquids having viscosities approaching that of water—is in the range of approximately 0.00215 to 0.00225.

A suck-back valve assembly in accordance with the invention includes a suck-back valve—such as the preferred form described above and herewithin—and an adapter that is attachable to a supply of liquid to be dispensed by the valve. The adapter is configured for secure and fluid-tight seated engagement with the spring member distal web, the adapter having an interior undercut for seated engagement with the distal web shoulder and the adapter including a body that bounds an interior continuous hollow that is open at its proximal and distal ends for accommodating the suck-back spring member in that hollow and through which liquid to be dispensed is flowable distally along and through the hollow for selective release of the liquid by the activated valve. The adapter may be further configured for securement of the adapter to a storage container of the liquid to be dispensed.

A liquid dispenser in accordance with the invention includes a suck-back valve—such as the preferred form describe above and herewithin—and a dispenser body that is secured to the valve and that defines a liquid storage reservoir for containing a supply of liquid to be dispensed by the valve. The dispenser body includes an outer wall that bounds a closed interior volume in which the liquid is contained and from which the liquid is releasable from the interior volume only through the valve when the valve is in its open condition, at least a portion of the outer wall being flexible to accommodate a reduction in its interior volume when a user of the liquid dispenser selectively applies an inwardly-directed force to the outer wall to thereby (i) apply the distally-directed activating force to the pin cone to distally displace the pin and thereby open the valve and (ii) cause distal displacement of the stored liquid from the reservoir toward the valve for dispensing of the displaced stored liquid through the valve in the open condition of the valve. The liquid dispenser may additionally include an adapter configured for secure and fluid-tight engagement with the spring member distal web and with the dispenser body with the adapter interposed between the spring member distal web and the dispenser body. The adapter may have an interior undercut for seated engagement with the distal web shoulder, and a body that bounds an interior continuous hollow open at its proximal and distal ends for accommodating the suck-back spring member in its hollow and through which liquid to be dispensed is flowable from the dispenser body reservoir distally along and through the hollow for selective dispensed release of the liquid by the activated valve.

These and other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar or corresponding elements throughout the several views:

FIG. 8 is a cross-sectional view, partly broken away, of the valve assembly of FIGS. 6 and 7 in the deactivated condition of the valve and combined with a liquid storage container to form a liquid dispenser in accordance with the invention; and FIG. 9 is a cross-sectional view of the liquid dispenser of FIG. 8 showing the valve in its activated condition.

DETAILED DESCRIPTION OF THE CURRENTLY PREFERRED EMBODIMENTS

A currently-preferred form of the inventive valve and valve assembly is depicted in FIGS. 1 to 9, all of which show in cross section the various elements of the inventive valve and related parts and elements as well as combinations and assemblies thereof. As will be appreciated, these elements, parts and assemblies define a preferably overall circular or otherwise ovoid construction—i.e. when viewed perpendicular to the illustrated cross sections, e.g. from the top or distal end—although other shapes are within the intended scope and contemplation of the invention as general matters of design choice. It is generally intended that the valve and/or valve assembly will be secured for use to a container or housing, preferably a flexible container, that contains a liquid to be operatively dispensed through the valve. By squeezing or otherwise selectively applying inwardly-directed force or pressure to the flexible container, the inventive valve is operatively activated or opened and the stored or contained liquid is dispensed through the valve exit opening or orifice. When the application of externally-applied pressure to the liquid container ceases, the valve operatively, smoothly, rapidly and positively closes—providing a positive, substantially leak-proof seal—and excess dispensed liquid that remains on and about the outside surfaces of the valve exit orifice is "sucked back" through the orifice to prevent dripping and leakage and unintended continued releases of the liquid, as well as to avoid waste of excess liquid that was not intended to be dispensed or otherwise applied to a work product or destination surface.

It should be understood that, as used herein, the term "liquid" is intended to mean—and the inventive valve is useful and can be readily configured to dispense—a flowable substance (that is neither solid nor gas) having a definite volume and no fixed shape, and having any of a wide range of viscosities, including by way of non-limiting example water (at one end of the spectrum) and creams (at the other).

Figure 5:
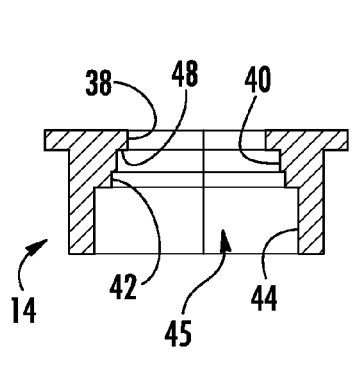
FIG. 5 is a cross-sectional view of an illustrative embodiment of an adapter for use with the suck-back valve of FIGS. 1 and 2.
Figure 6:
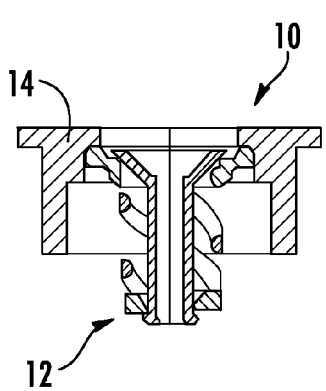
FIG. 6 is a cross-sectional view of a valve assembly in accordance with an embodiment of the invention combining the adapter of FIG. 5 with the suck-back valve of FIGS. 1 and 2 showing the deactivated condition of the valve.
Figure 7:
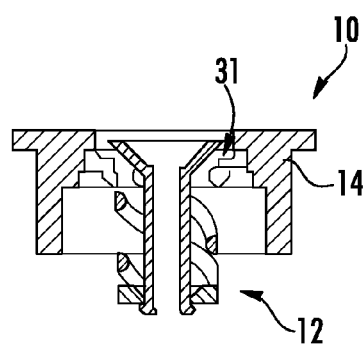
FIG. 7 is a cross-sectional view of the valve assembly of FIG. 6 showing the activated condition of the valve.

FIG. 6 depicts a currently preferred form of the inventive valve assembly, identified by the general reference numeral 10, in the closed or deactivated or non-dispensing position of the valve. The assembly 10 is formed by the valve 12—seen in its deactivated or closed position in FIG. 2—and an adapter 14 (FIG. 5). The adapter 14 is configured for secured or otherwise connected engagement with a liquid holding or storage container (not shown) and for secured attachment to the valve 12. As will become apparent, many aspects of the construction and configuration of the adapter 14 may and are intended to be varied to suit one or more of the size, shape, materials of construction and physical characteristics and the like of the particular liquid-storage container to be attached thereto, the manner of such attachment, the liquid (including its flow characteristics) to be dispensed through the inventive valve, and other matters of general design choice.

The valve 12 is formed by a spring 16 (FIG. 4) and a pin 18 (FIG. 3) which operatively reciprocates longitudinally within the spring 16. An elongated shaft 20 of pin 18 terminates at its lower (in the Figures) or proximal end with a radially outwardly projecting rib or lip 22 and at its upper or distal or working end with a frustoconical cone 24. The pin 18 is initially formed without the rib 22 which is shaped, as by the application of heat or mechanical manipulation or other processing applied to the proximal end of shaft 20, after shaft 20 is inserted proximally into and through the spring 16 as will hereinafter become apparent. In addition, a bore or aperture 26 is defined in and through the shaft 20 of pin 18. In currently preferred embodiments of the inventive valve, the bore has a diameter in the range of approximately 0.002 to 0.050 inches, and most preferably in the range of approximately 0.002 to 0.010 inches, dependent to at least some extent on the viscosity of the liquid to be dispensed, as it is not intended that the liquid being dispensed travel through the bore 26 as the liquid is dispensed from the associated storage container in the operation of valve 12. By way of example, for liquids with flow characteristics in the nature of or similar to water (e.g. water-based liquids), a diameter of approximately 0.0022 inches, plus or minus 0.0005 inches, has been found to provide the advantageous functionality and operational characteristics intended, and is particularly preferred. Highly viscous liquids, such as toothpaste, will realize most effective dispensing and suck-back operating results using a bore diameter at least approaching the upper end of the preferred range, i.e. approximately 0.050 inches. It should be pointed out that the depictions of pin 18 in the drawings are not to scale and, in particular, the relative size of the bore 26 in the Figures has been greatly exaggerated for ease of illustration.

Spring 16 has an upper or distal web 27 that defines a valve seat 28 that cooperatively receives the outer surface of the pin cone 24 in valve-closing, liquid-sealing abutment in a first or non-dispensing position (seen in FIG. 2) of pin 18. Seat 28 is formed by an angled lip that bounds a central opening 30 through which liquid is dispensed by the valve 12 through the spacing or passage 31 that is created between the seat 28 and the outer surface of cone 24 when pin 18 is longitudinally displaced, out of engagement with seat 28, distally toward and to its second or liquid dispensing position (seen in FIG. 1). Spring 16, distally of seat 28, defines a radially-widened discharge opening boundary wall 32 that, as currently preferred, tapers radially outward away from seat 28 and bounds the exit orifice 33 through which liquid is dispensed when the valve is activated or open.

Figure 1:
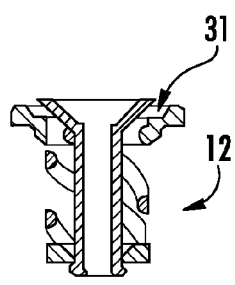
FIG. 1 is a cross-sectional view of a suck-back valve constructed in accordance with a preferred embodiment of the invention showing the valve in its activated condition.
Figure 2:
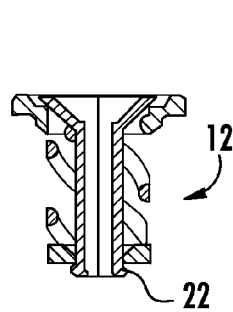
FIG. 2 is a cross-sectional view of the valve of FIG. 1 showing the valve in it deactivated condition.
Figure 3:
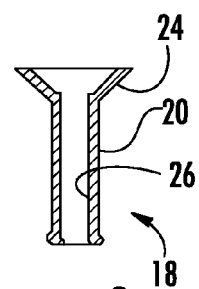
FIG. 3 is a cross-sectional view of the pin of the suck-back valve of FIGS. 1 and 2.
Figure 4:
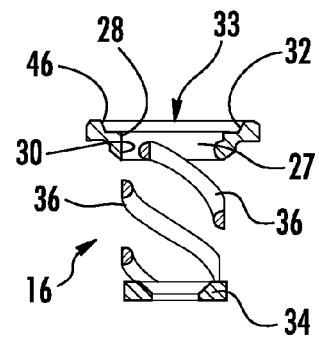
FIG. 4 is a cross-sectional view of the spring of the suck-back valve of FIGS. 1 and 2.

At its proximal end, spring 16 includes a transverse distal web in the form of a ring 34 that bounds an opening for, as will become apparent, receiving therethrough the proximal end of pin shaft 20. Ring 34 is spaced proximally from and connected to web 27 by a plurality, preferably three, of helical arms or spring bands 36. Spring 16 is preferably constructed as a single, unitary member of a material that imparts to the helical arms 36 suitable flexibility and resilience for normally maintaining the ring 34 and web 27 at a predetermined separation depicted in FIG. 2, for accommodating distal movement of ring 34 toward web 27 against a return urgency provided by the arms 36 when the valve is activated as seen in FIG. 1 for dispensing of liquid, and for returning ring 34 (using the return urgency of the arms 36) to its initial FIG. 2 position when the activated valve is deactivated to discontinue the dispensing discharge of stored liquid. The selection of the material of construction and associated characteristics of the spring 16 will be varied as a function of the type, viscosity and other characteristics of the liquid to be dispensed and the intended application or use of the inventive valve and valve assembly—for example to suitably adjust the extent of distal displacement of ring 34, the spacing or passage 31 through which liquid is to be dispensed and the desired return urgency provided by the helical arms 36. Currently contemplated materials of which spring 16 may be constructed include, by way of illustrative example, polyolefins, polyethylene, acetals and nylon.

As previously pointed out, valve 12 is formed of the combination of spring 16 and pin 18. To assemble valve 12, the proximal end of shaft 20 of pin 18 is inserted proximally through the distal exit orifice 33 of spring 16, through and along the interior space bounded by the helical arms 36 and, finally, through the opening bounded by ring 34. With the exterior surface of pin cone 24 in firm abutment with valve seat 28 of spring 16, and the proximal end of shaft 20 extending beyond the proximal termination of ring 34 (if necessary or desired by slight or otherwise predetermined compression of the helical arms 36), the proximal end of shaft 20 is treated with heat or by mechanical deformation or as otherwise desired to form thereon rib 22 in substantial abutment with ring 34. It is generally contemplated and preferred—although not strictly required—that in this FIG. 2 assembled arrangement of valve 12 the helical arms 36 are maintained in a compressed, preferably only slightly compressed, state so that the return urgency of arms 36 forcedly and positively maintains liquid-tight valve-closing contact between the exterior surface of cone 24 and valve seat 28. Depending on the amount or degree to which, if at all, the helical arms 36 are compressed in the FIG. 2 closed condition of valve 12, it may be desirable or desired to secure ring 24 to the proximal end of shaft 20.

Adapter 14 is configured as needed or appropriate for secure and preferably non-detachable engagement with a storage container or housing (not shown) of liquid that is to be operatively dispensed through valve 12 by selected user activation of the valve. The liquid storage container is not an element of the inventive valve and valve assembly, and may take any desired or appropriate (e.g., for the intended application and liquid to be dispensed) form. In currently preferred and generally intended applications, the container will have a flexible wall or wall portion to which the user can apply an inwardly-directed force to effect, by reason of the increased pressure within the interior of the container as a result of user-applied inwardly-directed force, a selective discharge of the stored liquid. Thus, by way of illustrative and non-limiting example, the liquid container may as preferred be resiliently flexible so that after a valve-deactivating release of user-applied inward pressure the container returns substantially to its initial shape, or it may be formed of a less resilient or substantially non-resilient material, such as a foil or like material commonly used for tubes of certain extremely viscous creams, which exhibit only minimal resilience following a liquid discharge.

Adapter 14 is additionally configured to receive and mate with valve 12 to retain the valve for operative use in dispensing liquid from a liquid storage container that is secured to or otherwise engaged with the adapter. The specific structural features and details of adapter 14—both for securement to or other engagement with a liquid storage container and for receipt and retention of valve 12—are generally matters of design choice based on the particular liquid container to be used, the liquid to be dispensed, the intended application or use, and the configuration, particularly the exterior features, of the spring web 27. The adapter primarily functions to retain and position the inventive valve 12 and to accommodate suitable attachment to the container from which stored liquid is to be dispensed by selective operation of the valve.

In the form of the adapter 14 depicted in, for example, FIG. 5, a series of generally concentric setback walls 38, 40, 42 and 44 variously bound a central chamber or interior hollow 45 of the adapter within which the valve 12 is fixed and positioned. To position valve 12, it is distally advanced into the central chamber of adapter 14 until distal shoulder surface 46 of spring web 27 abuts undercut 48 that connects adjacent setback walls 38, 40, and suitable affixation means or processes—such, for example, as sonic welding, or adhesives—are utilized to non-releasably secure to each other at least surface 46 and undercut 48. In the preferred embodiment of the valve assembly 10 depicted in the drawings, the internal diameter of the region bounded by setback wall 38 is substantially the same as the distal edge of spring wall 32 that bounds the exit orifice 33 of spring 16.

The resulting valve assembly 10, in the closed or deactivated condition of the valve 12, is depicted in FIG. 6.

To effect a user-initiated discharge of stored liquid through valve 12, inwardly-directed pressure is applied to the associated liquid storage container, as for example by squeezing or otherwise applying an inwardly-directed force to the container wall. It is generally contemplated that at least a portion of the container wall will be flexible for accommodating such an inwardly-directed force, and preferably resiliently flexible, although container walls that instead include some manner of manipulatable element or attachment that, when actuated, causes the desired decrease in interior volume (and corresponding increase in internal pressure) are also within the intended scope and contemplation of the invention. In any event, the resulting increase in internal pressure acts, in the closed condition of the valve, on that part of the exterior surface of pin cone 24 proximal of valve seat 28 and causes distal (i.e., upward in the drawings) longitudinal displacement of pin 18 from its valve-closed position (FIGS. 2 and 6) to its valve-open position (FIGS. 1 and 7), thereby opening the liquid discharge spacing passage 31. Stored liquid from the attached container is thereby forced or displaced distally and released through the passage 31 under the increased internal pressure effected by the resulting decrease in container volume as at least a portion of the container wall is displaced inward. Distal longitudinal displacement of pin 18 also carries with it spring ring 34, by reason of its abutment with pin shaft rib 22, against the return urgency of the helical arms 36 which are compressed by the distal displacement of pin 18.

When the user discontinues the application of inward pressure to the storage container wall—i.e., with the intention of halting the continued discharge of stored liquid—and releases that inward pressure to allow the container to resiliently (if the container wall is resiliently flexible) reassume its original (or close to its original) form, the return urgency of the compressed helical arms 36 drives ring 34 proximally toward its initial FIGS. 2 and 6 position and, through its abutment with rib 22, thereby drives pin 18 in the same direction to return pin 18 to its FIGS. 2 and 6 position in which the outer surface of cone 24 firmly abuts seat 28 and thereby closes valve 12 against continued liquid discharge. Bore 26 which extends through pin 12, and is sized so that the subject liquid cannot readily pass therethrough, provides a pathway through which ambient air can be drawn into the interior of the dispenser assembly—i.e. the closed interior of the combined valve assembly 10 and liquid storage housing or container—as pin 18 is returned under the urgency of the compressed helical arms 36 to close valve 12, thus both preventing creation of a vacuum or partial vacuum within the dispenser assembly and facilitating smooth, rapid and substantially uninterrupted valve-closing return of pin 18 to its FIGS. 2 and 6 position. As explained below, however, as a consequence of, inter alia, its predetermined sizing, bore 26 is effective to provide a return pathway for ambient air during only a small or partial portion of the proximal or return displacement motion of pin 18.

The preferred relatively small diameter of the bore 26 ambient air return pathway, and suitable selection of the return urgency provided by helical arms 36 for the stored liquid that is intended to be dispensed, additionally delivers advantageously enhanced "suck-back" functionality when the application of inwardly-directed liquid-dispensing force to the container wall ceases. To avoid creation of a partial vacuum or negative pressure within the dispenser interior as the resiliently flexible container returns (in the generally preferred resilient form of the container wall) at least in part to its pre-activation condition, ambient air is drawn back into the dispenser interior through the discharge passage 31 that is defined between valve seat 28 and the exterior surface of cone 24 in the open, and partially open, conditions of the valve 12. Of course, as pin 18 proximally returns toward its valve-closed position of FIGS. 2 and 6, that passage or spacing 31 is steadily reduced until, ultimately, the cone surface contacts the valve seat to fully close the valve. It will be appreciated that, from the start through much of the return travel of pin 18 from its valve-open toward its valve-closed position, the size of passage 31—i.e. the spacing between the valve seat and cone wall surface—will be many times greater than the diameter of the bore 26 and, as a consequence, ambient air to equalize the pressure in the dispenser interior will at least primarily (if not entirely) be drawn in through passage 31 rather than through the much smaller bore 26. As ambient air is drawn in through passage 31, it carries with it excess dispensed liquid which, for example, has remained on and about the exit orifice and proximal surfaces of adapter 14. This so-called "suck-back" effect is known in the art, although not in a configuration (or as optimally or successfully) as that provided in accordance with the present invention.

The problem with prior art implementations of valves exhibiting "suck-back" functionality is that, as the valve—whatever its structure—reaches the point at which it is very close to attaining its fully closed condition, this "suck-back" effect diminishes or entirely ceases. Considering, for purposes of explanation, the herein-depicted valve construction of the present invention, as pin 18 closely approaches its valve-closed position of FIGS. 2 and 6, the spacing between the surface of cone 24 and valve seat 28 is so reduced that any excess dispensed liquid remaining on or closely about the exit orifice and proximal surfaces interferes with continued draw-back of ambient air and, with it, any of the remaining liquid on the exterior of the assembly. Moreover, in this same range of close approach—i.e. just before the pin 18 attains its ultimate valve-closing position—the spacing or passage 31 is so reduced in size that very little ambient air is able to pass through passage 31 to equalize the pressure in the dispenser interior, particularly where, as is not uncommon, the preceding portion of the return travel of pin 18 has not entirely eliminated excess dispensed liquid that remains on or about the exit orifice and proximal surfaces of adapter 14. This results in a significant change, and more particularly a reduction, in the travel velocity of the pin and interferes with smooth and continuous closure of the valve.

In accordance with the present invention, however, pin 18 includes the predeterminately-sized bore 26, through which return ambient air is drawn into the dispenser interior, most especially during that final portion of the return (proximal-direction) travel of pin 18 which is closely proximate ultimate valve closure—and thus assures continued rapid and uninterrupted return motion of pin 18. In doing so, the inventive valve 12 maximizes "suck-back" of dispensed liquid that remains on or about the exit orifice and proximal surfaces of adapter 14, and assures that no significant remainder of such excess dispensed liquid is left in that region. This smooth, rapid and uninterrupted return motion of the pin additionally results in an enhanced, tight and more positive substantially leak-proof seal by the closed valve than is attainable or has been realized in the prior art.

An illustrative and readily understood and familiar example of an advantageous, application for the valve and valve assembly of the invention is the delivery of toothpaste from a tube. It is a common and, indeed, universal experience that, after a user squeezes the tube to dispense a suitable amount of the toothpaste onto, e.g., a toothbrush, and then releases pressure on the tube, the tube wall resiliently returns to or close to its original form and some amount of the excess toothpaste that has remained adhered to and about the exit orifice is "sucked-back" into the tube. However, in almost all cases a not-insignificant volume of the excess toothpaste remains adhered to and about the tube's exit orifice when the tube is no longer being squeezed; it is virtually unknown to find no excess toothpaste remaining on and about the dispensing orifice. Using the valve and valve assembly of the present invention, on the other hand, "suck-back" of effectively all, for all practical purposes, of such excess dispensed toothpaste can be repeatedly achieved. This advantageous result and consistently repeatable functionality has not heretofore been realized or attainable in liquid dispensing valves functionally similar or akin to that of the present invention.

FIGS. 8 and 9 depict, by way of illustrative example and to facilitate explanation, one form of a liquid dispenser formed of the valve assembly 10 and an associated liquid storage container housing 52, shown in the respective closed and open conditions of the valve 12. Housing 52 as herein shown is formed by a continuous wall 54 that is coupled, as by ultrasonic welding or an adhesive or a mechanical or interference fit or by any other suitable attachment process or arrangement (which may optionally provide a disengageable securement to enable removal and replacement of the housing 52) at its distal end of the adapter 14 and which bounds and defines a liquid storage reservoir 56 from which stored liquid contained therein is dispensable through the open or activated valve 12. Wall 54 may include, proximate its distal end, helical screw threads 58 for releasable engagement with an associated closure cap (not shown) for the liquid dispenser 50. It is generally contemplated and intended that the wall 54, at least in some portion of the proximal portion of the wall that defines the reservoir in which the liquid to be dispensed is contained, be sufficient flexible so that inwardly directed force applied to the exterior surface of the wall, e.g. selectively by a user, can effect a discharge or dispensing through the actuated valve of stored liquid by virtue of a resulting increase in the internal pressure of the reservoir and housing interior—although embodiments in which other arrangements for increasing the interior pressure and/or selectively actuating the valve are also with in the intended scope and contemplation of the invention. Those skilled in the art will also understand and appreciate that the housing 52 and adaptor 14 may alternatively be configured or constructed or otherwise implemented as a single unit or as other combinations or configurations of elements to provide the same or equivalent or corresponding functionality in conjunction with an embodiment of the inventive suck-back valve, all as general matters of design choice.

When a user selectively applies inward force against the wall 54 and thereby effects a decrease in the volume and, therefore, an increase in the interior pressure of reservoir 56, a distally (i.e. upwardly in FIGS. 8 and 9) directed force is applied against the exterior surface of pin cone 24, causing the distal displacement of pin 18 (against the return urgency of spring bands 36) and thereby opening the valve 12. This decrease in volume (and increase in interior pressure) likewise distally displaces stored liquid in the reservoir 56 toward the valve 12 and outwardly through the discharge spacing passageway formed by the open valve to thereby dispense stored liquid from the liquid dispenser through the exit orifice 33.

While there have been shown and described and pointed out fundamental novel features of the invention as applied to preferred embodiments thereof, it will be understood that various omissions and substitutions and changes in the form and details of the structures shown and described, and in their operation and use, may be made by those skilled in the art without departing from the spirit of the invention. Moreover, it should be recognized that structures and devices shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A suck-back valve selectively actuatable for dispensing liquid through a dispensing opening in an open condition of the valve, comprising:

a spring member comprising a distal web that defines an exit orifice bounded by a shoulder wall, a proximal web, and a plurality of flexibly elastic bands helically connecting the distal web and proximal web for resiliently urging the distal web and the proximal web toward a predetermined spacing; and a pin comprising an elongated shaft having a proximal end and carrying a substantially hollow frustoconical cone at a distal end of the shaft, said cone having an outer valving surface and said shaft having a bore of predetermined cross-sectional extent defined longitudinally along and within the shaft to create a continuous fluid passageway through and along the pin;

wherein the pin is coupled at the pin proximal end to the proximal web of the spring member and the cone valving surface abuts, in a closed condition of the valve, the distal web shoulder wall to capture the pin within the spring member for relative longitudinal displacement of the pin between a first position in which the valve is closed and a second position in which the valve is open for dispensing of liquid, so that a distally-directed actuating force selectively applied to the pin distally displaces the pin and the coupled proximal end of the proximal web against a compressive return urgency of the elastic bands to reduce the spacing between the distal web and the proximal web and to displace the valving surface distally from the valving surface abutment with the distal web shoulder to open the valve and enable a dispensing release of the liquid through the discharge opening of the open valve;

wherein the distal web shoulder comprises a valve seat against which the valving surface abuts in the closed position of the valve, and wherein with said distal displacement of the pin the valving surface moves from abutment with the valve seat to define, between the valving surface and the valve seat, the dispensing opening as a spacing between the valving surface and the valve seat; and wherein the pin bore is predeterminately sized so that, when the distally-directed actuating force on the pin is at least reduced, the return urgency of the elastic bands proximally displaces the pin to close the dispensing opening between the valving surface and the valve seat and enable at least some dispensed liquid that remains proximate the dispensing opening to be sucked back through the pin bore as the valve is deactivated from the open condition to the closed condition.

2. A suck-back valve in accordance with claim 1, wherein the pin is sized so that, in the closed condition of the valve, the bands are maintained in a compressed condition.

3. A suck-back valve in accordance with claim 1, wherein the valve seat has a predetermined radius and the distal web shoulder further comprises a discharge opening boundary wall distal of the valve seat and having a radius greater than the predetermined radius of the valve seat.

4. A suck-back valve in accordance with claim 3, wherein the distal web shoulder further comprises a wall that defines a central opening proximal of the valve seat and having a radius smaller than the predetermined radius of the valve seat.

5. A suck-back valve in accordance with claim 4, wherein the valve seat comprises an annular lip between the discharge opening boundary wall and the central opening of the distal web shoulder.

6. A suck-back valve in accordance with claim 1, wherein the frustoconical cone comprises a hollow frustoconic shell and the valving surface comprises a radially-outer surface of the shell.

7. A suck-back valve in accordance with claim 1, wherein the pin bore has a diameter in the range of approximately 0.002 to 0.050 inches.

8. A suck-back valve in accordance with claim 1, wherein the pin bore has a diameter in the range of approximately 0.002 to 0.010 inches.

9. A suck-back valve in accordance with claim 1, wherein the pin bore has a diameter in the range of approximately 0.00215 to 0.00225 inches.

10. A suck-back valve assembly comprising:
a suck-back valve selectively actuatable for dispensing liquid through a dispensing opening in an open condition of the valve; and
an adapter attachable to a supply of liquid to be dispensed by the valve; wherein said suck-back valve comprises:
a spring member comprising a distal web that defines an exit orifice bounded by a shoulder wall, a proximal web, and a plurality of flexibly elastic bands helically connecting the distal web and proximal web for resiliently urging the distal web and the proximal web toward a predetermined spacing; and
a pin comprising an elongated shaft having a proximal end and carrying a substantially hollow frustoconical cone at a distal end of the shaft, said cone having an outer valving surface and said shaft having a bore of predetermined cross-sectional extent defined longitudinally along and within the shaft to create a continuous fluid passageway through and along the pin;

wherein the pin is coupled at the pin proximal end to the proximal web of the spring member and the cone valving surface abuts, in a closed condition of the valve, the distal web shoulder wall to capture the pin within the spring member for relative longitudinal displacement of the pin between a first position in which the valve is closed and a second position in which the valve is open for dispensing of the liquid, so that a distally-directed activating force selectively applied to the pin distally displaces the pin and the coupled proximal end of the proximal web against a compressive return urgency of the elastic bands to reduce the spacing between the distal web and the proximal web and to displace the valving surface distally from the valving surface abutment with the distal web shoulder to open the valve and enable a dispensing release of the liquid through the discharge opening of the open valve;

wherein the distal web shoulder comprises a valve seat against which the valving surface abuts in the closed position of the valve, and wherein with said distal displacement of the pin the valving surface moves from abutment with the valve seat to define, between the valving surface and the valve seat, the dispensing opening as a spacing between the valving surface and the valve seat; and wherein the pin bore is predeterminately sized so that, when the distally-directed activating force on the pin is at least reduced, the return urgency of the elastic bands proximally displaces the pin to close the dispensing opening between the valving surface and the valve seat and enable at least some dispensed liquid that remains proximate the dispensing opening to be sucked back through the pin bore as the valve is deactivated from the open condition to the closed condition; and wherein the adapter is configured for secure and fluid-tight seated engagement with the spring member distal web, the adapter having an interior undercut for seated engagement with the distal web shoulder and the adapter comprising a body that bounds an interior continuous hollow open at proximal and distal ends for accommodating the suck-back spring member in said hollow and through which the liquid to be dispensed is flowable distally along and through said hollow for selective release of the liquid by the activated valve.

11. A suck-back valve assembly in accordance with claim 10, wherein the adapter is further configured for securement of the adapter to a storage container of the liquid to be dispensed.

12. A suck-back valve assembly in accordance with claim 10, wherein the pin is sized so that, in the closed condition of the valve, the bands are maintained in a compressed condition.

13. A suck-back valve in accordance with claim 10, wherein the valve seat has a predetermined radius and the distal web shoulder further comprises a discharge opening boundary wall distal of the valve seat and having a radius greater than the predetermined radius of the valve seat.

14. A suck-back valve in accordance with claim 13, wherein the distal web shoulder further comprises a wall that defines a central opening proximal of the valve seat and having a radius smaller than the predetermined radius of the valve seat.

15. A suck-back valve in accordance with claim 14, wherein the valve seat comprises an annular lip between the discharge opening boundary wall and the central opening of the distal web shoulder.

16. A suck-back valve in accordance with claim 10, wherein the frustoconical cone comprises a hollow frustoconic shell and the valving surface comprises a radially-outer surface of the shell.

17. A suck-back valve in accordance with claim 10, wherein the pin bore has a diameter in the range of approximately 0.002 to 0.050 inches.

18. A suck-back valve in accordance with claim 10, wherein the pin bore has a diameter in the range of approximately 0.002 to 0.010 inches.

19. A suck-back valve in accordance with claim 10, wherein the pin bore has a diameter in the range of approximately 0.00215 to 0.00225 inches.

20. A liquid dispenser, comprising:
a suck-back valve selectively actuatable for dispensing liquid through a dispensing opening in an open condition of the valve; and
a dispenser body that is secured to the valve and that defines a liquid storage reservoir for containing a supply of liquid to be dispensed by the valve;
wherein the suck-back valve comprises:
a spring member comprising a distal web that defines an exit orifice bounded by a shoulder wall, a proximal web, and a plurality of flexibly elastic bands helically connecting the distal web and proximal web for resiliently urging the distal web and the proximal web toward a predetermined spacing; and
a pin comprising an elongated shaft having a proximal end and carrying a substantially hollow frustoconical cone at a distal end of the shaft, said cone having an outer valving surface and said shaft having a bore of predetermined cross-sectional extent defined longitudinally along and within the shaft to create a continuous fluid passageway through and along the pin;
wherein the pin is coupled at the pin proximal end to the proximal web of the spring member and the cone valving surface abuts, in a closed condition of the valve, the distal web shoulder wall to capture the pin within the spring member for relative longitudinal displacement of the pin between a first position in which the valve is closed and a second position in which the valve is open for dispensing of the liquid, so that a distally-directed activating force selectively applied to the pin distally displaces the pin and the coupled proximal end of the proximal web against a compressive return urgency of the elastic bands to reduce the spacing between the distal web and the proximal web and to displace the valving surface distally from abutment with the distal web shoulder to open the valve and enable a dispensing release of the liquid through the discharge opening of the open valve;
wherein the distal web shoulder comprises a valve seat against which the valving surface abuts in the closed position of the valve, and wherein with said displacement of the pin the valving surface moves from abutment with the valve seat to define, between the valving surface and the valve seat, the dispensing opening as a spacing between the valving surface and the valve seat; and
wherein the pin bore is predeterminately sized so that, when the distally- directed actuating force on the pin is at least reduced, the return urgency of the elastic bands proximally displaces the pin to close the dispensing opening between the valving surface and the valve seat and enable at least some dispensed liquid that remains proximate the dispensing opening to be sucked back through the pin bore as the valve is deactivated from the open to the closed condition; and
wherein the dispenser body comprises an outer wall that bounds a closed interior volume in which the liquid is contained and from which the liquid is releasable from the interior volume only through the valve when the valve is in the open condition, at least a portion of the outer wall being flexible to accommodate a reduction in said interior volume when a user of the liquid dispenser selectively applies an inwardly-directed force to the outer wall to thereby (i) apply the distally-directed activating force to the pin cone to distally displace the pin and thereby open the valve and (ii) cause distal displacement of the stored liquid from the reservoir toward the valve for dispensing of the displaced stored liquid through the valve in the open condition of the valve.

21. A liquid dispenser in accordance with claim 20, further comprising an adapter configured for secure and fluid-tight engagement with the spring member distal web and with the dispenser body with the adapter interposed between the spring member distal web and the dispenser body, the adapter having an interior undercut for seated engagement with the distal web shoulder and the adapter comprising a body that bounds an interior continuous hollow open at its proximal and distal ends for accommodating the suck-back spring member in said hollow and through which the liquid to be dispensed is flowable from the dispenser body reservoir distally along and through said hollow for selective dispensed release of the liquid by the activated valve.

22. A liquid dispenser in accordance with claim 20, wherein the pin is sized so that, in the closed condition of the valve, the bands are maintained in a compressed condition.

23. A suck-back valve in accordance with claim 20, wherein the valve seat has a predetermined radius and the distal web shoulder further comprises a discharge opening boundary wall distal of the valve seat and having a radius greater than the predetermined radius of the valve seat.

24. A suck-back valve in accordance with claim 23, wherein the distal web shoulder further comprises a wall that defines a central opening proximal of the valve seat and having a radius smaller than the predetermined radius of the valve s eat.

25. A suck-back valve in accordance with claim 24, wherein the valve seat comprises an annular lip between the discharge opening boundary wall and the central opening of the distal web shoulder.

26. A suck-back valve in accordance with claim 20, wherein the frustoconical cone comprises a hollow frustoconic shell and the valving surface comprises a radially-outer surface of the shell.

27. A suck-back valve in accordance with claim 20, wherein the pin bore has a diameter in the range of approximately 0.002 to 0.050 inches.

28. A suck-back valve in accordance with claim 20, wherein the pin bore has a diameter in the range of approximately 0.002 to 0.010 inches.

29. A suck-back valve in accordance with claim 20, wherein the pin bore has a diameter in the range of approximately 0.00215 to 0.00225 inches.

* * * * *